(12) United States Patent
Sturmon

(10) Patent No.: US 8,562,081 B2
(45) Date of Patent: Oct. 22, 2013

(54) TRACK SHOE ASSEMBLY FOR CONTINUOUS TRACK VEHICLES

(75) Inventor: George R. Sturmon, St. Charles, MO (US)

(73) Assignee: Bleeding Edge Ensys, LLC, Sullivan, MO (US)

( * ) Notice: Subject to any disclaimer, the term of this patent is extended or adjusted under 35 U.S.C. 154(b) by 490 days.

(21) Appl. No.: 12/650,296

(22) Filed: Dec. 30, 2009

(65) Prior Publication Data

US 2010/0270857 A1 Oct. 28, 2010

Related U.S. Application Data

(60) Provisional application No. 61/172,755, filed on Apr. 26, 2009.

(51) Int. Cl.
*B62D 55/28* (2006.01)
*B62D 55/12* (2006.01)

(52) U.S. Cl.
USPC ............................ 305/189; 305/201; 305/203

(58) Field of Classification Search
USPC .......... 305/187, 189–192, 196–198, 200–203
See application file for complete search history.

(56) References Cited

U.S. PATENT DOCUMENTS

| | | | |
|---|---|---|---|
| 1,955,751 A | 4/1934 | Knox et al. | |
| 1,973,214 A | 9/1934 | Lamb | |
| 2,089,210 A | 8/1937 | Knox et al. | |
| 2,301,954 A | 11/1942 | Knox | |
| 2,332,976 A | 10/1943 | Saurer et al. | |
| 2,430,573 A | 11/1947 | Krotz | |
| 3,313,578 A | 4/1967 | Wright et al. | |
| 3,357,750 A | 12/1967 | Reynolds et al. | |
| 3,578,823 A | 5/1971 | Clymer | |
| 4,139,241 A | 2/1979 | Huhne et al. | |
| 4,165,906 A | 8/1979 | Fix | |
| 4,195,887 A | 4/1980 | Ruddell | |
| 4,311,346 A | 1/1982 | Danner | |
| 4,494,393 A * | 1/1985 | Bruce | 72/57 |
| 4,505,984 A | 3/1985 | Stelzer et al. | |
| 4,668,025 A | 5/1987 | Macdonald | |
| 4,765,694 A | 8/1988 | Cory | |
| 4,840,395 A | 6/1989 | Sturmon | |
| 4,840,438 A | 6/1989 | Cory | |

(Continued)

FOREIGN PATENT DOCUMENTS

| EP | 2045175 A2 | 8/2009 |
|---|---|---|
| JP | 10297554 A | 11/1998 |

OTHER PUBLICATIONS

Astrum, "Tank Tracks and Armour," http://www.army-technology.com/contractors/tracks/astrum/ (Feb. 25, 2009), 2 pp.

(Continued)

*Primary Examiner* — Jason Bellinger
(74) *Attorney, Agent, or Firm* — Polster, Lieder, Woodruff & Lucchesi, L.C.

(57) ABSTRACT

An improved track shoe assembly for a continuous track vehicle. The track shoe assembly comprises a pin which is rotatable relative to a shoe of the track shoe assembly. The track shoe assembly comprises an elastomeric tube through which the pin extends, the elastomeric tube being rotatable with respect to one of the pin and the shoe and being fixed with respect to the other of the pin and the shoe.

18 Claims, 6 Drawing Sheets

(56) References Cited

U.S. PATENT DOCUMENTS

| | | |
|---|---|---|
| 4,843,114 A | 6/1989 | Touchet et al. |
| 5,264,290 A | 11/1993 | Touchet et al. |
| 5,749,634 A | 5/1998 | Wiesner et al. |
| 5,988,614 A | 11/1999 | Sturmon |
| 5,994,664 A | 11/1999 | Anderton et al. |
| 6,080,493 A | 6/2000 | Kent |
| 6,521,688 B1 * | 2/2003 | Linzmeier et al. ............ 524/430 |
| 7,090,312 B2 | 8/2006 | Soucy et al. |
| 7,416,266 B2 | 8/2008 | Soucy et al. |
| 7,445,299 B2 | 11/2008 | Gonzalez |

OTHER PUBLICATIONS

Gary'S Combat Vehicle Reference Guide, "M1 Abrams Main Battle Tank," http://www.inetres.com/gp/military/cv/tank/M1.html (Apr. 13, 2009), 14 pp.

Written Opinion and Search Report of International Searching Authority in PCT/2010/032368, Jan. 28, 2011.

* cited by examiner

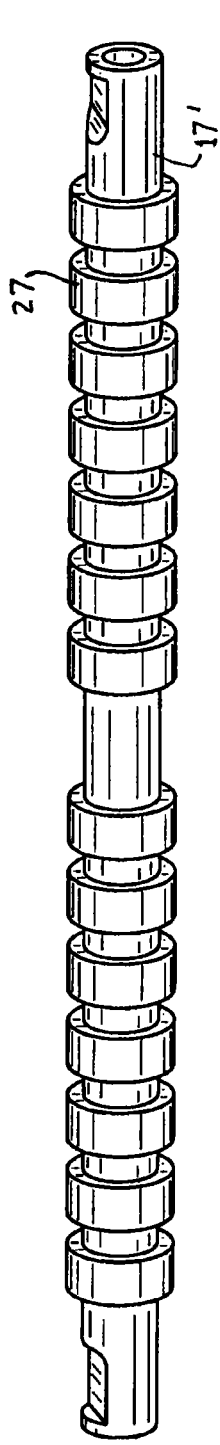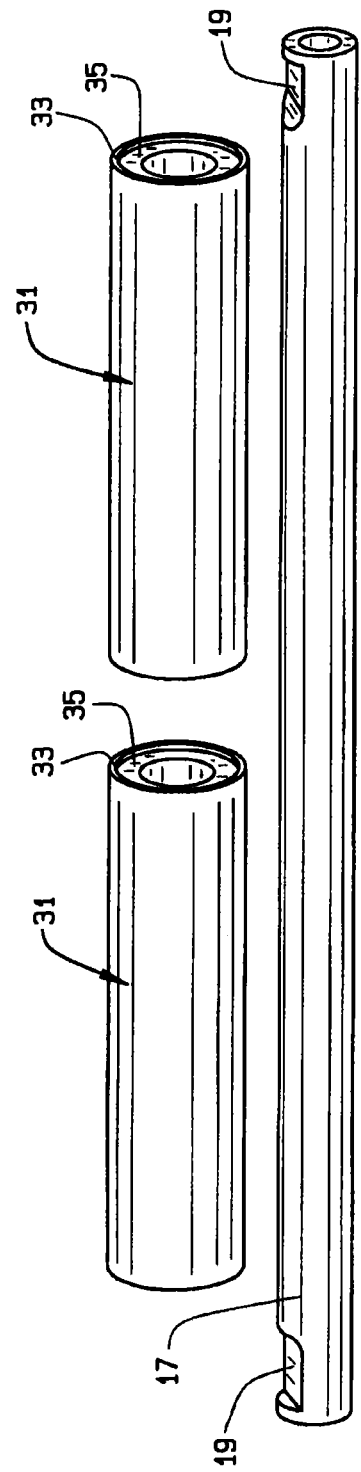

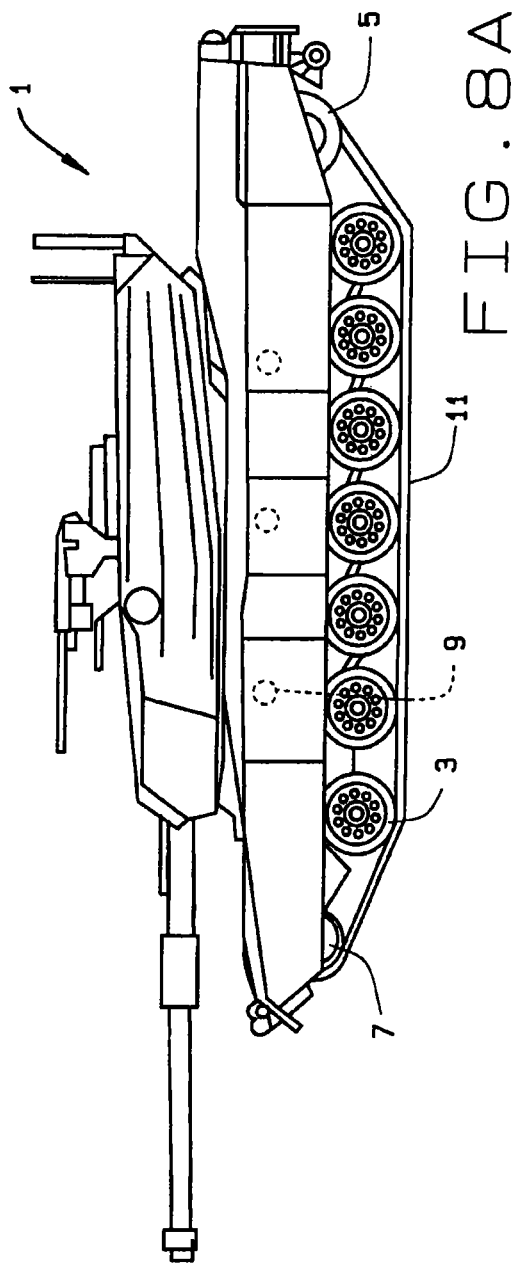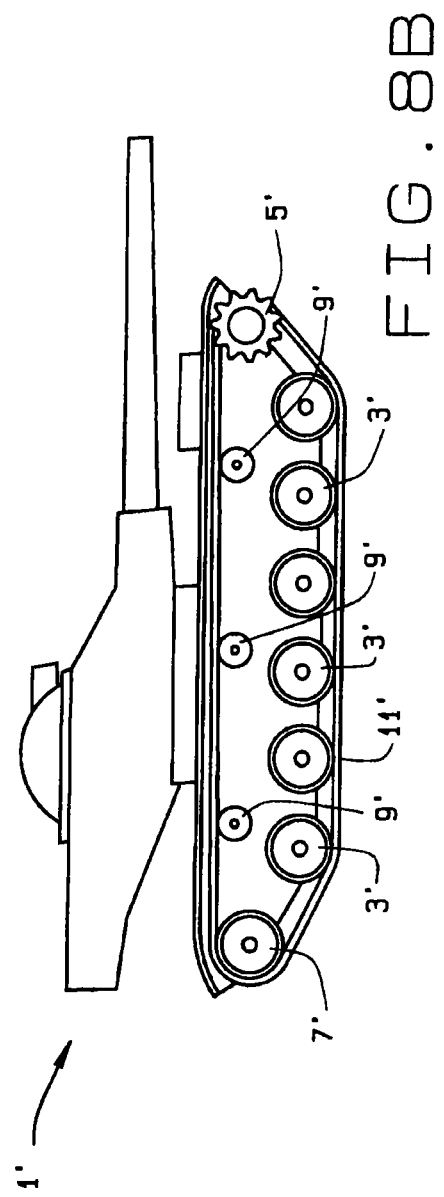
FIG. 8A
FIG. 8B

TRACK SHOE ASSEMBLY FOR CONTINUOUS TRACK VEHICLES

CROSS-REFERENCE TO RELATED APPLICATIONS

Priority is claimed to U.S. Provisional Application 61/172,755, filed Apr. 26, 2009, the disclosure of which is hereby incorporated by reference.

STATEMENT REGARDING FEDERALLY SPONSORED RESEARCH

Not Applicable.

BACKGROUND OF THE INVENTION

Continuous track vehicles (also known as "track laying" vehicles) are well known and widely used. The present invention relates to such vehicles and has particular applicability to military tanks. The construction of military tanks and their tracks is well known and is described for example in Cory, U.S. Pat. No. 4,765,694, Kent, U.S. Pat. No. 6,080,493, Soucy et al, U.S. Pat. No. 7,416,266, Gonzalez, U.S. Pat. No. 7,445,299, and Touchet et al, U.S. Pat. No. 5,264,290, the disclosures of all of which are hereby incorporated by reference.

Briefly, a military tank typically includes two tracks, one on each side of the vehicle. Each track has a road-engaging side and an inner side which engages a set of road wheels, as well as a drive sprocket at the forward or rearward end of the vehicle, an idler wheel at the other end of the vehicle, and support rollers along an upper reach of the track above the road wheels. The track itself is formed of track shoe assemblies. Each assembly typically includes two track shoes, spaced laterally from each other and separated by a center guide which guides the track around the road wheels, drive sprocket, idler wheel and support rollers. Each track shoe carries an elastomeric inwardly-facing road wheel pad bonded to its inner face and an elastomeric outwardly-facing road pad removably mounted to its outer face. The pads are generally rubber, although composite pads have also been proposed for the road pad.

Each track shoe assembly also includes two pin assemblies extending laterally across and beyond the track shoe assembly. The pin assemblies hold the two track shoes of each shoe assembly together in alignment with each other, and the ends of pin assemblies of adjacent shoe assemblies are connected by end connectors. In one modern arrangement, the center guide is mounted on the pin assemblies of adjacent shoe assemblies, so that a projection part of the center guide straddles adjacent shoe assemblies, rather than being centered between the track shoes of a single shoe assembly. Although metal bushings have been used in tractor-type continuous track vehicles, as described for example by Wright, U.S. Pat. No. 3,313,578, large continuous track vehicles, such as military tanks, have used rubber bushings.

In a military tank or the like, each pin assembly includes a hollow pin in the form of a steel shaft drilled out to reduce its weight. Multiple rubber bushings are bonded to the exterior of the pin. Bonding is typically produced by injection molding the rubber onto the pin, and then vulcanizing the rubber. The number of bushings shown in the patent literature is generally two: one for each track shoe. In practice, seven rubber "donuts" are bonded to the pin for each track shoe, giving fourteen rubber bushings for each pin assembly, in an arrangement similar to Krotz, U.S. Pat. No. 2,430,573. This arrangement allows the rubber to compress and spread laterally (axially of the pin) when the pin assembly is forced into the shoe assembly. The rubber conventionally has a nominal hardness of about 75 A on the Shore hardness scale before it is compressed by about forty percent when pushed into the sleeve of the track shoe assembly. The force required to push the pin into the shoe assembly requires a thirty- to fifty-ton press. For many years, the art has taught that, "Such compression must be sufficient so that there is no rotation between the bushing and the outer sleeve portions or the pin upon bending of the track during use." (Cory, U.S. Pat. No. 4,840,438 at col. 2, lines 9-12). This arrangement insures that "relative rotation therebetween [between the pin and the track shoe] along the length of the pin assembly is controlled by elastic deformation of the resilient bushing." (Id. at col. 13, lines 41-43). Because the rubber bushings are bonded to the pin, there has been no need to machine the pin to close tolerances, and the pin may have a variation in diameter of as much as 0.020" (0.5 mm) and may deviate substantially from being linear. Conventional pin assemblies incorporating compressed bushings are disclosed in Knox et al, U.S. Pat. No. 1,955,751, Lamb, U.S. Pat. No. 1,973,214, Knox et al, U.S. Pat. No. 2,089,210, Knox, U.S. Pat. No. 2,301,954, Saurer et al U.S. Pat. No. 2,332,976, Krotz, U.S. Pat. No. 2,430,573, Reynolds et al, U.S. Pat. No. 3,357,750, Huhne et al, U.S. Pat. No. 4,139,241, Fix, U.S. Pat. No. 4,165,906, Ruddell, U.S. Pat. No. 4,195,887, and Wiesner, U.S. Pat. No. 5,749,634, the disclosures of all of which are hereby incorporated by reference.

Cory, U.S. Pat. No. 4,840,438, discloses that the extreme compression required by the conventional compressed bushings creates assembly problems and also "results in a greater resistance to the required bending during use and a consequent greater power requirement for driving of the associated vehicle." To solve this problem, Cory molds and bonds the rubber bushing in situ to the pin and to a pair of sleeve sections having a positioning flange which fits into a groove in the associated track shoe when the bushing is compressed about 5% and pressed into the shoe assembly. The flange and groove prevent rotation of the pin assembly with respect to the shoe assembly, thereby insuring any relative rotation of the pin and shoe is controlled by elastic deformation of the rubber. Cory's arrangement, however, adds considerable complexity and additional manufacturing requirements, thereby substantially increasing the cost of the track.

Particularly with heavy continuous track vehicles, such as military tanks, the lifetime of the track is very short, frequently a few hundred miles of use. When the track fails, the vehicle may become unusable. The failure of tank tracks creates a huge financial cost and may cause logistical issues and personnel safety issues. The problem is particularly acute with tanks of the size of a Bradley Fighting Vehicle having a weight of greater than about twenty-five tons, an M-60 battle tank having a weight greater than about fifty tons, or an Abrams M-1 battle tank having a weight greater than about fifty tons to about seventy-five tons or more. The problem has long been known, as witnessed for example by Ruddell, U.S. Pat. No. 4,195,887, filed 1978 ("The compressive and shear loads placed on the elastomeric bushings far exceed the capabilities of present elastomers to withstand these loads and the elastomeric bushings wear out and must be replaced."), Cory, U.S. Pat. No. 4,840,438, effectively filed 1985 ("The constantly increasing weight and speed of track laying vehicles has resulted in a decrease in the track life and a constant increasing need for track maintenance by either repair or replacement."), or Kent, U.S. Pat. No. 6,080,493, filed 1998

("A complete set of tracks for a U.S. Army M-1 Abrams tank can cost as much as $100,000.00 and may only last from 300 to 2000 miles.").

The problems with track life are two-fold. Although the inner road wheel pads apparently exhibit little wear, the outer road pads are subject to substantial wear and to hazards such as puncturing. They are therefore made to be field replaceable. Second, and more seriously, the rubber bushings rapidly fail. In practice, the bushings generally fail before the road pads, so the entire track is frequently replaced before the road pads can be field replaced. Replacing the entire track requires removing the tank to a repair facility via a tank carrier vehicle.

BRIEF SUMMARY OF THE INVENTION

Briefly stated, the present invention provides an improved track shoe assembly for a continuous track vehicle.

In accordance with an embodiment of the invention, the track shoe assembly includes a pin which is rotatable relative to a shoe of the track shoe assembly. The preferred track shoe assembly includes two bushings; each bushing has a metal sleeve and an elastomeric tube bonded to the interior of the sleeve. Each sleeve is force-fit into a shoe of the track shoe assembly. The pin is pushed through the elastomeric tubes and in use rotates freely with respect to the elastomeric tube. The elastomeric tube is preferably formed of polyurethane. The polyurethane in some embodiments has a Shore hardness of at least 60 D; in other embodiments, the Shore hardness is between about 65 D and about 70 D; in yet other embodiments the Shore hardness is between about 95 A and 110 A. Generally, the polyurethane is chosen to have excellent hysteresis properties, that is, it does not build up substantial heat as it is stressed and released. In some embodiments, the sleeve is a DOM (drawn over mandrel) steel tube and has a wall thickness of about 0.030" to about 0.100" (about 0.76 mm to about 2.5 mm); in other embodiments the sleeve has a wall thickness of 0.06" (1.5 mm)±20%. In an illustrative embodiment, the sleeve has a diameter of 2.00" (50.80 mm). In some embodiments, the elastomeric tube has a wall thickness of about 0.1" to about 0.25" (about 2.5 mm to about 6.4 mm); in other embodiments, the elastomeric tube has a wall thickness of 0.2" (5.1 mm)±15%.

Because polyurethane, unlike rubber, internally relieves stresses, because the polyurethane is not prestressed by forcing the bushing into the track shoe, because the bearing area of the polyurethane elastomer is greatly increased as compared with conventional rubber donuts, and because the polyurethane does not control the rotation of the pin with respect to the shoes by elastic deformation, the bushings of the present invention will greatly outwear conventional rubber bushings. The decrease in differential stress produced by the shoe assemblies of the present invention extends not only to the bushings but to the pins and other components of the tracked vehicle, thereby increasing both performance and durability.

Because they do not limit rotation of the pin with respect to the shoes, the bushings of the present invention are also expected to reduce the energy required to propel the vehicle, thereby increasing performance and efficiency. The improvements produced by the present invention are more remarkable in light of the long-standing belief that bonding of the bushings to prevent rotation with respect to both the pin and the shoe of the track is essential to operation of the track. The success of the present bushings also belies the belief that rotatable mounting of the pins would lead to standing waves in the upper reaches of the continuous track and early failure of the track.

In accordance with another embodiment of the invention, the pin is machined, preferably centerless ground, to a tolerance of 0.001", thereby permitting the pin to be inserted into the bushings mounted in the shoes of the track shoe assembly with the use of a hand-held mallet or sledge. The pin is preferably made of 4340 steel, heat treated and shot peened for hardness, then drilled out to reduce its weight.

The bushing of the present invention is related to the bushings described in my prior patents, U.S. Pat. Nos. 4,840,395 and 5,988,614, the disclosures of which are hereby incorporated by reference. The modified bushing of the present invention, however, has heretofore been considered by those skilled in the art as unusable in a track shoe assembly of a heavy endless track vehicle.

In accordance with another embodiment of the invention, the road pad of the shoe is formed of polyurethane having good abrasion and puncture resistance and having a Shore hardness of about 90 A to 95 A. This pad provides far longer life than the rubber pad, despite having inferior hysteresis characteristics. The hysteresis test is currently relied upon as the chief indicator of pad life.

In accordance with another embodiment of the invention, the road wheel pad is made of polyurethane having a Shore hardness of 95 A to 105 A, having good hysteresis characteristics, heat resistance, and puncture resistance.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a view in side elevation of a conventional pin assembly for use in the continuous track of an M-1 tank.

FIG. 2 is a view in side elevation of a pin and bushings of the present invention for use in the continuous track of an M-1tank.

FIGS. 8A and 8B are views in side elevation of an M-1 tank and an M-60 tank, respectively, in which embodiments of the present invention may be used.

Corresponding reference numerals indicate corresponding parts throughout the several figures of the drawings.

DESCRIPTION OF THE PREFERRED EMBODIMENT

Figure 3:
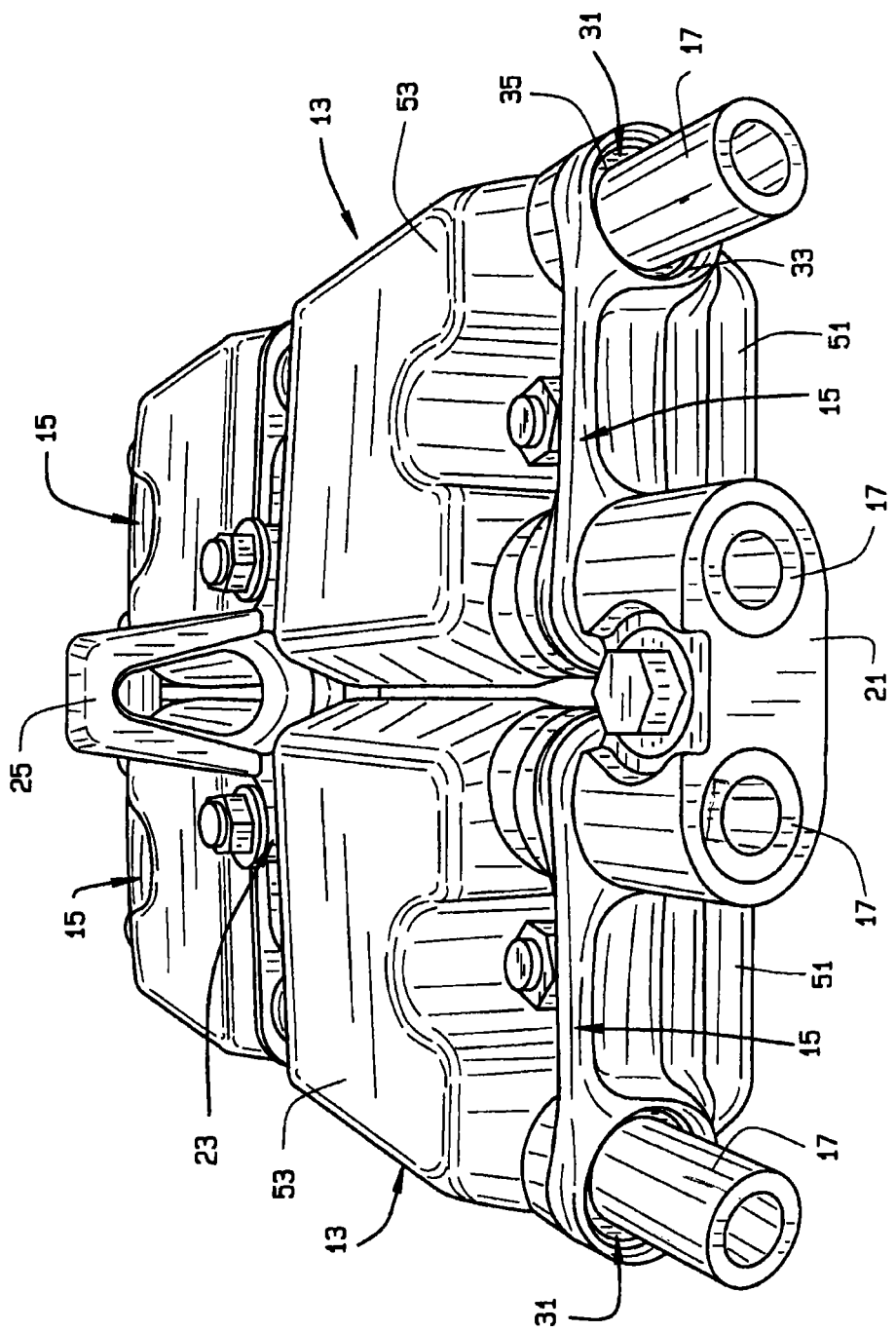
FIG. 3 is a view in upper side perspective of two adjacent shoe assemblies of the present invention.
Figure 4:
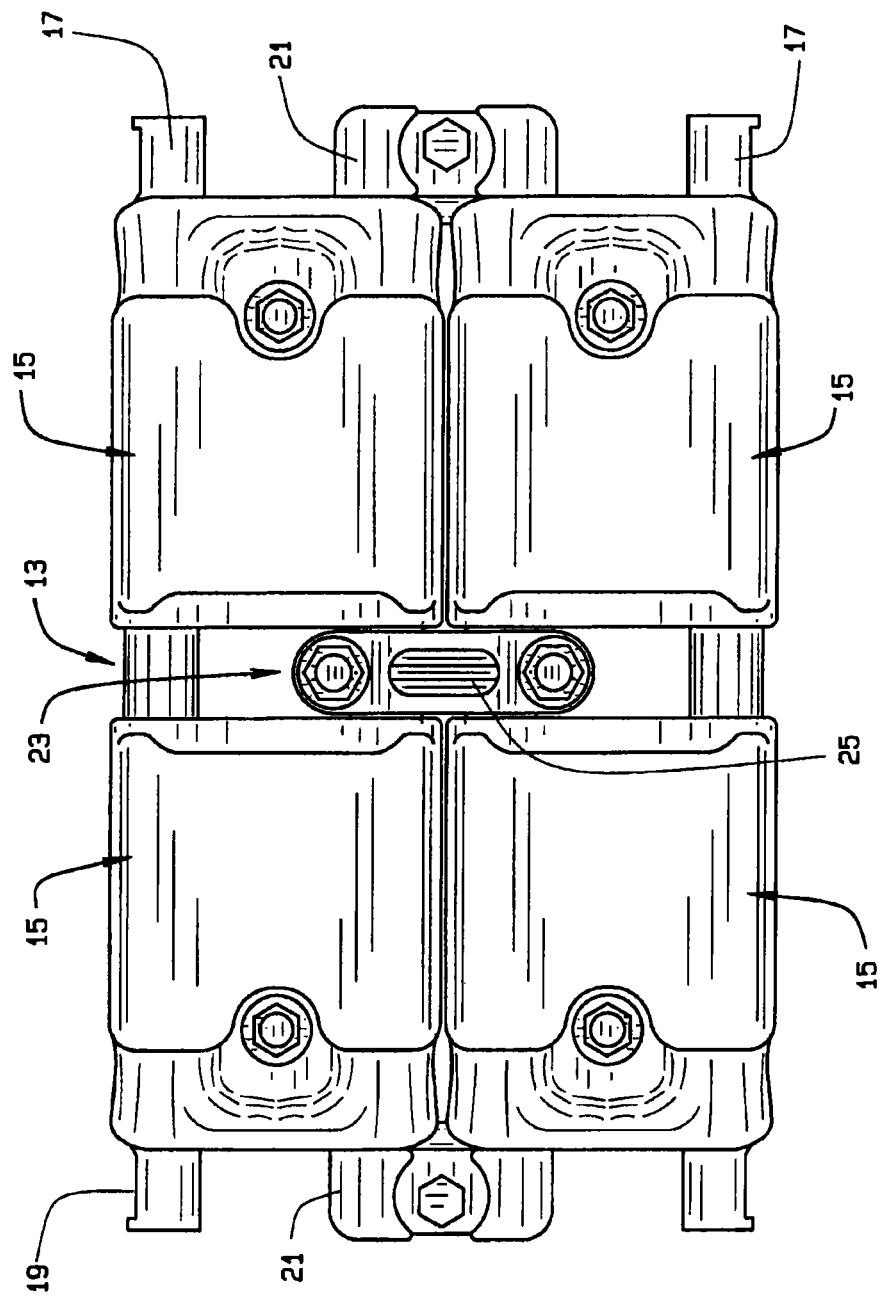
FIG. 4 is a top plan view of two adjacent shoe assemblies of the present invention showing their inner, road wheel pads.
Figure 5:
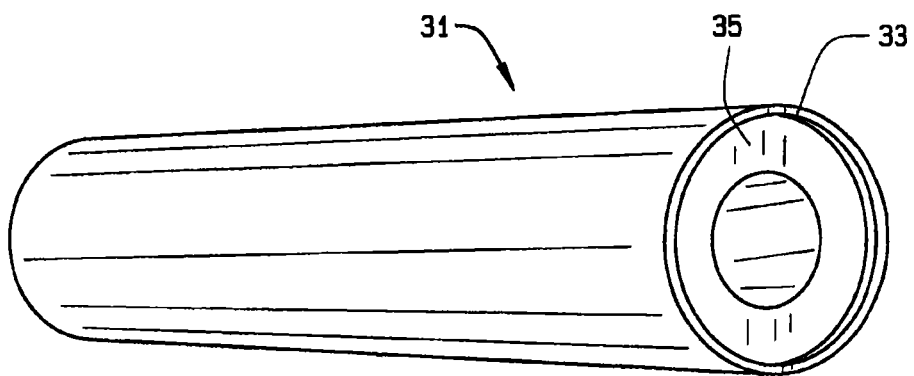
FIG. 5 is a perspective view of a blank for a bushing for use with the pin assemblies and shoe assemblies of FIGS. 2-4.
Figure 6A:
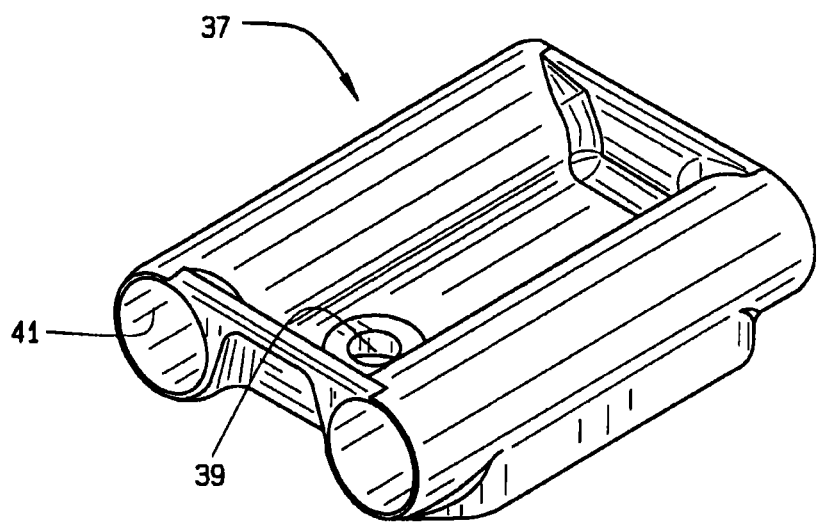
FIGS. 6A and 6B are perspective and end views, respectively, of a cast and machined-steel track shoe for use in the present invention, before bonding of a road wheel pad to its top, installation of a road pad to its bottom, and installation of bushings
Figure 6B:
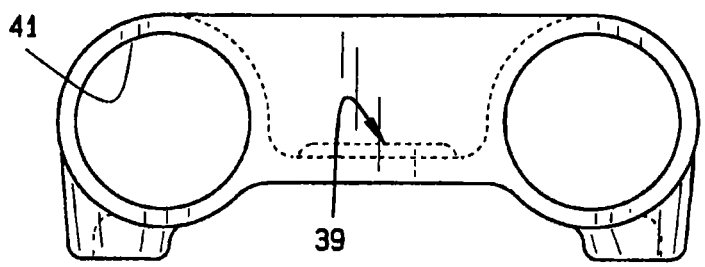
Figure 7:
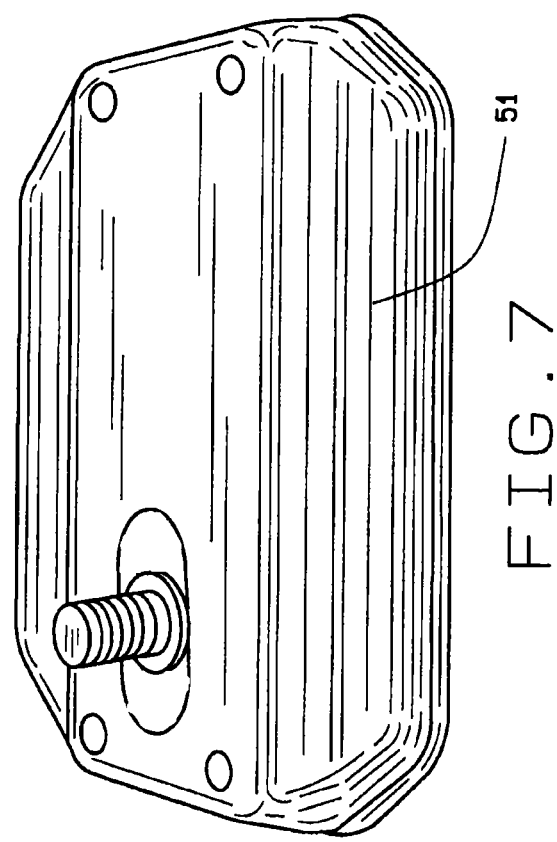
FIG. 7 is a perspective view of a road pad of the present invention.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As shown in FIG. 8A, an Abrams M-1 tank 1 includes, on each side, road wheels 3, a drive sprocket 5 at the rear of the vehicle, an idler wheel 7 at the front of the vehicle, and support rollers 9 along an upper reach of the track above the road wheels. A continuous track 11 passes around these wheels, sprockets and rollers and drives the tank 1. The M-60 tank 1' shown in FIG. 8B is similar, but has six road wheels 3', has its drive sprocket 5' at its forward end, has its idler wheel 7' at the rear, and has a continuous track 11'. Because the M-60 tank lacks the side armor of the M-1 tank, its support rollers 9' are visible.

The track 11 is made up of track shoe assemblies 13. Each shoe assembly 13 includes two shoes 15 mounted side by side on pins 17.

In this embodiment, the pins 17 are about 25.5" (sixty-five cm) long and 1.5" (38.1 mm) in diameter. The pins are provided with flats 19 near their ends to accommodate standard track shoe assembly end connectors 21. Each pin is formed of a steel shaft drilled out to reduce its weight.

A center guide 23 is mounted on the pins of adjacent shoe assemblies, so that a projection part 25 of the center guide straddles adjacent shoe assemblies, rather than being centered between the track shoes of a single shoe assembly.

As thus far described, the construction is that of a standard military tank, well known in the art for many years.

In the prior art construction shown in FIG. 1, a pin assembly includes a steel pin 17' with fourteen rubber donut bushings 27 bonded to the pin 17'. In accordance with the present invention, the pin assembly which has heretofore been pressed into the track shoes is replaced with bushings 31 pressed into the track shoe and a modified pin 17 which is pushed through the bushings and rotates freely with respect to the bushings during operation of the tank.

Each bushing 31 is formed of an outer sleeve 33 and a polyurethane tube 35 bonded to the inside of the sleeve 33. In some embodiments, in which side load is expected, the end of the sleeve 33 may be turned inward sufficiently to prevent or restrain movement of the polyurethane axially beyond the end of the sleeve 33. The sleeve 33 is a DOM (drawn over mandrel) low carbon steel tube. The sleeve 33 has a length of 9" (22.9 cm) and has a wall thickness of 0.075" (1.9 mm) and an outer diameter of 2.000" (50.80 mm). Although the wall thickness of the sleeve 33 is not critical, the outer diameter of the sleeve 33 is chosen to give a line-to-line fit with a tubular opening in the shoes 15 as described below. The polyurethane tube 35 is formed and bonded to the sleeve 33 by sandblasting the inner surface of the tube, applying a bonding agent, and pouring liquid polyurethane into the sleeve, around a central mandrel. The central opening in the polyurethane tube is then bored out to 1.500" (38.10 mm) diameter. The polyurethane material is chosen to have low hysteresis (low internal heating with repeated stresses and releases) and an unstressed hardness of Shore 60 D to 70 D. A suitable material is sold by ITWC, Inc., Malcom, Iowa, 50157, US, and is identified as ATRO PL07, having a hardness of 65 D. Another suitable material is sold by UET, LLC, Peoria, Ariz., 85345, as its 8001-A-82%, having a hardness of 62 D. The PL07 material has been shown to have a load-deflection curve similar to that of the rubber conventionally used in tank track bushings.

The track shoe 15 is conventionally made of a cast steel shoe body 37 having a lower face to which a road pad is bolted and an upper face to which a road wheel pad is bonded. The body 37 includes a bolt hole 39 for accepting a bolt of the road pad and two cylindrical openings 41 which accept and hold the pin assemblies of a conventional shoe assembly. The track shoe 15 of the invention is modified by boring out the openings 41 to give them a true and uniform diameter of 2004" (5.090 mm). Because the openings 41 and bushings are nine inches (22.9 cm) long, the fit between them is tight, requiring on the order of ten to twenty tons of pressure to install them and providing no rotation between the bushing and the shoe 15.

The modified pin 17 is made of 4340 steel, heat treated and shot peened for hardness, and drilled out to reduce its weight. The outside diameter of the pin 17 is machined by centerless grinding, to exactly 1.5" (38.1 mm) in diameter with a tolerance of about 0.001", thereby permitting the pin to be inserted into the bushings mounted in the shoes 15 of the track shoe assembly 13 with the use of a hand-held mallet or sledge. The pin 17 is conventionally 25.5" (sixty-five cm) long and has flats 19 ground near each end, to accept conventional connectors 21 which assemble the track.

The removable road pad 51 bolted to each shoe 15 is formed to the same dimensions as a conventional rubber road pad, but is formed of polyurethane having good abrasion and puncture resistance and having a Shore hardness of about 92 A. This pad provides far longer life than the rubber pad, despite having inferior hysteresis characteristics. The hysteresis test is currently relied upon as the chief indicator of pad life.

The road wheel pad 53 bonded to each shoe 15 is made of polyurethane having a Shore hardness of 95 A to 105 A, having good hysteresis characteristics, heat resistance, and puncture resistance.

Numerous variations in the track shoe assemblies, bushings, pads, and pins of the present invention, within the scope of the appended claims, will occur to those skilled in the art. Merely by way of example, the elastomeric tube 35 could be bonded directly to the opening 41 of the shoe and the sleeve 33 omitted. This arrangement would require more aggressive removal of the elastomer, as by boring or burning, in order to rehabilitate the bushing, but would permit the wall of the opening 41 to be made thicker if desired. For use with track laying vehicles such as the Bradley Fighting Vehicle System in which the pin is conventionally non-circular, the elastomeric tube 35 can be bonded to the pin and made rotatable with respect to the sleeve 33. Alternatively, an enlarged circular-cross section can be provided on the central part of the pin, as by utilizing a modified pin or fitting a sleeve over the central part of the conventional pin.

As various other changes could be made in the above constructions without departing from the scope of the invention, it is intended that all matter contained in the above description or shown in the accompanying drawings shall be interpreted as illustrative and not in a limiting sense.

All patents and patent applications mentioned herein are hereby incorporated by reference.

The invention claimed is:

1. A track shoe assembly for a continuous track vehicle, the track shoe assembly comprising a pin and a shoe, the track shoe assembly comprising an elastomeric tube through which the pin extends, the elastomeric tube in use being rotatable with respect to one of the pin and the shoe and being fixed with respect to the other of the pin and the shoe.

2. The assembly of claim 1 wherein the track shoe assembly comprises two shoes, each shoe comprising a rigid body, an elastomeric road pad attached to one side of the body, and an elastomeric road wheel pad attached to an opposite side of the body, the rigid body having a cylindrical opening extending therethrough, and a sleeve mounted in the cylindrical opening, the elastomeric tube being mounted in the sleeve.

3. The assembly of claim 2 wherein the elastomeric tube is bonded to the interior of the sleeve and in use rotates freely with respect to the pin.

4. The assembly of any of claims 1-3 wherein the elastomeric tube is made of polyurethane having a Shore hardness of at least 65D.

5. The assembly of claim 2 wherein each sleeve is force-fit into the cylindrical opening of a shoe of the shoe assembly.

6. A method of assembling a track of a continuous track vehicle, the track comprising a plurality of track shoe assemblies, the method comprising mounting at least two coaxial elastomeric tubes to each shoe assembly, thereafter pushing pins through the coaxial elastomeric tubes, and rigidly connecting one pin associated with a first shoe assembly with a second pin associated with a second shoe assembly, the pins pushed through the elastomeric tubes rotating freely in use with respect to their respective elastomeric tubes.

7. The method of claim 6 wherein the elastomeric tube is formed of polyurethane having a Shore hardness of at least 65D.

8. The method of claim 6 comprising a step, before pushing the pin through the elastomeric tube, of machining the pin.

9. The method of claim 8 wherein the pin is machined by centerless grinding.

10. A track shoe assembly for a continuous track vehicle, the track shoe assembly comprising a pin and a shoe, the track shoe assembly comprising an elastomeric tube through which the pin extends, the elastomeric tube in use being rotatable with respect to one of the pin and the shoe and being fixed with respect to the other of the pin and the shoe, wherein the track shoe assembly comprises two shoes, each shoe comprising a rigid body, an elastomeric road pad attached to one side of the body, and an elastomeric road wheel pad attached to an opposite side of the body, the rigid body having a cylindrical opening extending therethrough, and a sleeve mounted in the cylindrical opening, the elastomeric tube being mounted in the sleeve, and wherein each rigid body has two cylindrical openings extending therethrough, and a sleeve mounted in each said cylindrical opening, each said elastomeric tube being bonded to its respective sleeve.

11. The assembly of claim 10 wherein a single said pin is rotatably mounted in two elastomeric tubes, one tube being mounted in each of said two shoes.

12. A method of assembling a track of a continuous track vehicle, the track comprising a plurality of track shoe assemblies, the method comprising mounting at least two coaxial elastomeric tubes to each shoe assembly, thereafter pushing pins through the coaxial elastomeric tubes, and rigidly connecting one pin associated with a first shoe assembly with a second pin associated with a second shoe assembly, wherein each said elastomeric tube is non-rotatably mounted in a sleeve.

13. The method of claim 12 wherein a bonding agent is applied to an inner surface of each said tube, thereafter a liquid polymer is poured into the sleeve, and thereafter the liquid polymer is cured to form the elastomeric tube.

14. The method of claim 12 further comprising forming a central bore having a diameter equal to the diameter of the pin in the elastomeric tube before the pin is pushed through the elastomeric tube.

15. A method of assembling a track shoe of a continuous track vehicle, the track shoe comprising a rigid body having two cylindrical openings extending therethrough, an elastomeric road pad attached to one side of the rigid body, and an elastomeric road wheel pad attached to an opposite side of the rigid body, the method comprising mounting a sleeve in each said cylindrical opening and bonding an elastomeric tube to each said sleeve, each elastomeric sleeve having an inner diameter, and thereafter pushing pins through the elastomeric tubes, the pins having substantially the same outer diameter as the inner diameters of the elastomeric tubes, the pins being rotatable in use with respect to the elastomeric tubes.

16. The method of claim 15 wherein the sleeves are mounted in the rigid body after at least one of the road pad and the road wheel pad is attached.

17. The method of claim 15 wherein a bonding agent is applied to an inner surface of each said sleeve, thereafter a liquid polymer is poured into the sleeve, and thereafter the liquid polymer is cured to form the elastomeric tube.

18. The method of claim 15 wherein the elastomeric tubes are bonded to the sleeves before the sleeves are mounted in the cylindrical openings of the rigid body.

* * * * *